INVENTOR
Esten W. Spears
BY
Paul Fitzpatrick
ATTORNEY

Aug. 19, 1958 E. W. SPEARS 2,847,825
GAS TURBINE THRUST AUGMENTER COMPRISING
WATER INJECTION RING
Filed July 31, 1953 2 Sheets-Sheet 2

INVENTOR
Esten W. Spears
BY
ATTORNEY

United States Patent Office 2,847,825
Patented Aug. 19, 1958

2,847,825

GAS TURBINE THRUST AUGMENTER COMPRISING WATER INJECTION RING

Esten W. Spears, Indianapolis, Ind., assignor to General Motors Corporation, Detroit, Mich., a corporation of Delaware Application July 31, 1953, Serial No. 371,432

7 Claims. (Cl. 60—39.32)

This invention relates to gas turbine engines and more particularly to thrust augmenters therefor.

Aircraft gas turbine engines of turbojet and turboprop type are provided with various types of thrust augmenters for increasing their energy output for short periods of time for take-offs and for various emergency conditions. Thrust augmentation is accomplished by the injection of an evaporative coolant liquid ahead of and/or within the compressor and/or within the combustion chamber and/or the injection of auxiliary fuel for afterburning in the combustion chamber or the tailpipe of the engine. This invention is particularly directed to a thrust augmenter of the type wherein a suitable evaporative coolant such as water or a water-alcohol mixture is injected into the combustion chamber of the engine.

Introducing evaporative coolant into the combustion chamber increases the mass flow through the engine resulting in greater shaft output for the turboprop engine or more jet thrust for the turbojet engine. Water is a desirable coolant because of its high latent heat of vaporization and alcohol is added to the water in suitable amounts to prevent freezing in cold weather and at high altitude flight. The use of water injection is restricted to short periods because of the parasitic weight that the water adds to the aircraft.

An object of the invention is to provide an effective water injection arrangement for the combustion chamber of a gas turbine engine.

Further objects and advantages of the present invention will be apparent from the following description, reference being had to the accompanying drawings, wherein a preferred form of the present invention is clearly shown.

Figure 1:
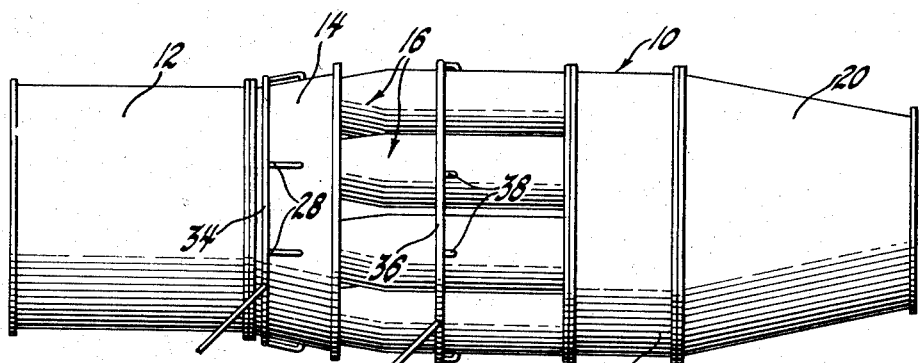
Fig. 1 is a plan view of a gas turbine engine incorporating the invention.
Figure 2:
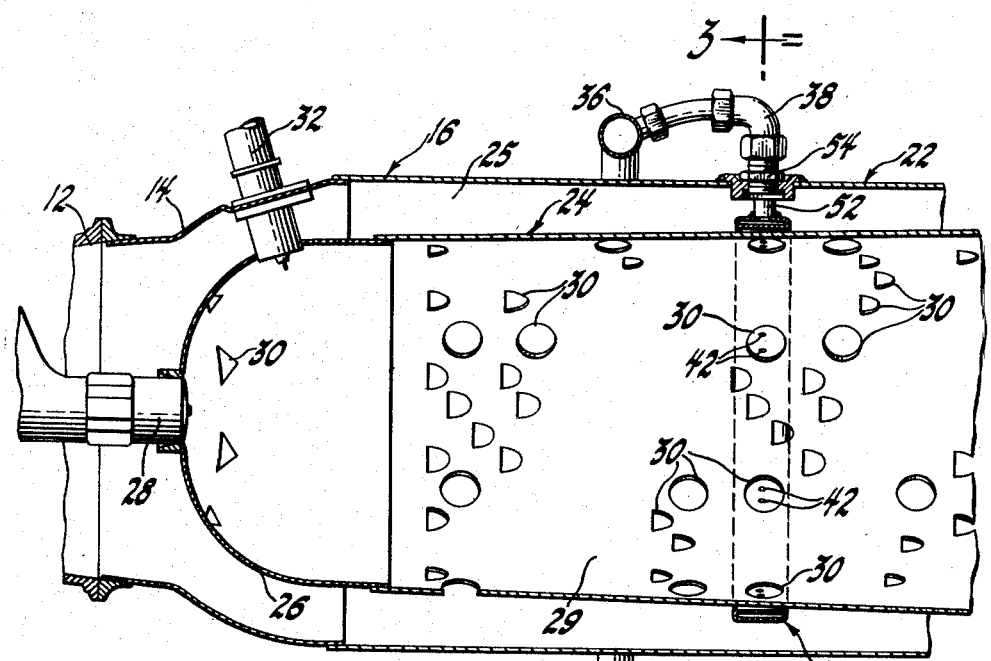
Fig. 2 is a partial longitudinal section through a combustion chamber of the gas turbine engine of Fig. 1.
Figure 3:
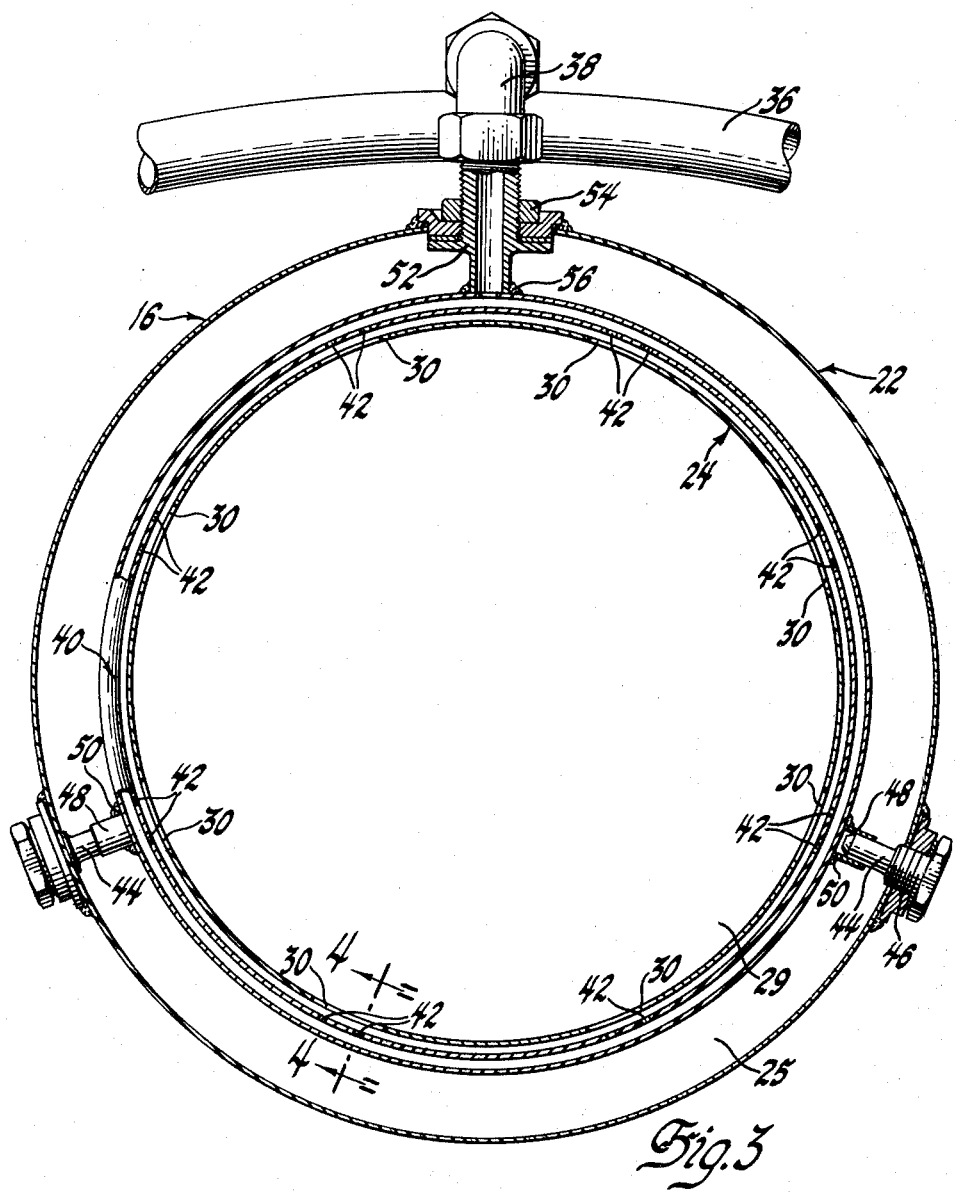
Fig. 3 is a section taken substantially on the plane indicated by the line 3—3 of Fig. 2.
Figure 4:
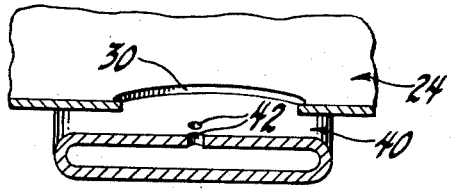
Fig. 4 is a partial section taken substantially on the plane indicated by the line 4—4 of Fig. 3.

Referring particularly to Fig. 1, the gas turbine engine 10 is here shown to be of the turbojet type but it should be realized that the invention is likewise applicable to the turboprop type of engine. The engine includes an axial flow air compressor 12 which delivers compressed air through a diffuser 14 to a circular row of cannular combustors 16 for fuel admixture and burning therein. Expansion of the heated gases through a turbine 18 powers the compressor 12 (and a propeller if desired). A tailpipe or nozzle 20 projects the exhaust from the turbine in a jet stream to propel the associated aircraft.

Referring to the remaining figures, each combustor 16 includes an annular outer jacket 22 and an annular perforated flame container 24 supported therein in spaced coaxial relation to form an air chamber 25. The diffuser 14 serves as a common air inlet portion for the combustors 16 and the nozzle of the turbine 18 serves as a common hot gas outlet portion. The combustors 16 and thrust augmenters are identical so only one will be described. The flame tube 24 carries a perforated cap 26 at its forward end and a fuel nozzle 28 arranged to project fuel therein. Air from the chamber 25 is fed to the combustion chamber 29 interior the flame tube 24 through perforations 30, suitably spaced around the periphery of the flame tube. An igniter 32 fires the fuel-air mixture initially, combustion being continuous during engine operation. A common ring manifold 34 furnishes fuel to the various fuel nozzles 28 from a suitable metering device and source (not shown).

A common ring manifold 36 delivers a water-alcohol mixture through conduits 38 to the various thrust augmenters 40 of the combustors 16 from a suitable metering device and source (not shown). The augmenter 40 comprises a flattened ring manifold which encircles a median perforated portion of the flame tube 24 in closely spaced relation. The manifold 40 is provided with radial passages 42 around its inner periphery and arranged in radial registration with some of the peripheral perforations 30 of the flame tube 24 to inject the augmenting liquid into the combustion chamber 29.

The augmenting liquid is injected into the median portion of the flame tube shown herein because the flame is hottest in this region and tests indicate that greatest thrust augmentation is achieved by injecting the liquid in the region of hottest flame. The region of hottest flame will vary with different combustor designs and it should be realized that the point of augmenting liquid injection may be varied in accordance therewith. The manifold 40 is flattened longitudinally to present the least possible interference with the air flow in the air chamber 25. The small sized numerous outlets 42 provide proper penetration of the flame by the augmenting liquid. The air streams through perforations 30 aid penetration by providing transport assistance to the augmenting liquid streams. The injector manifold 40 is located exterior the flame tube 24 so as to be completely bathed by the air flow in the air chamber 25 and thus protected from the heated and burning gases in the combustion chamber 29.

The manifold 40 is supported from the jacket in a manner that permits differential thermal expansion. The support includes a pair of peripherally spaced pins 44 that are threaded at 46 to a reinforced portion of the jacket and which are slideably interconnected to the manifold by a pair of sleeves 48 which are welded at 50 to the manifold. The pins 44 and sleeves 48 extend in radial direction and permit the manifold 40 to expand and contract with temperature changes. The third point of support comprises a threaded fitting 52 secured to the jacket 22 by a bolt 54 and to the manifold 40 by a weld 56. The fitting 52 places the injector tube 40 in communication with the main manifold conduits 38. The third point of support need not be slideable as the pin supports accommodate the thermal growth of the manifold 40.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

I claim:

1. A gas turbine comprising an air compressor; a combustor including an annular jacket, a flame tube forming a combustion chamber and spaced within the jacket to form an annular air chamber therewith for receiving air from the compressor, the periphery of the flame tube being provided with spaced perforations therearound to supply air from the air chamber to the combustion chamber, means for supplying fuel to the combustion chamber, and means for igniting the fuel and air supplied thereto; a gas turbine driven by heated gases from the combustion chamber; an exhaust nozzle for discharging exhaust gases from the turbine; a thrust augmenter for injecting thrust augmenting liquid into the combustion chamber comprising a ring manifold in the air chamber encircling the flame tube and provided with spaced orifices around its inner periphery arranged in registering relation with some of the perforations in the flame tube that supply the air from the air chamber to inject the thrust augmenting liquid therethrough and means for supporting the ring manifold for differential thermal expansion relative the combustor jacket and flame tube and so that the outer periphery thereof is spaced from the inner periphery of the jacket and so that the inner periphery thereof is spaced from the outer periphery of the flame tube whereby air flow in the air chamber can progress past said outer and inner peripheries of the ring manifold.

2. A gas turbine arrangement as claimed in claim 1 wherein the ring manifold is solely supported by the combustor jacket.

3. A gas turbine arrangement as claimed in claim 1 wherein the ring manifold is slideably supported by the combustor jacket.

4. A gas turbine arrangement as claimed in claim 1 wherein the ring manifold is supported from the combustor jacket by peripherally spaced and radially extending pin and sleeve connections to accommodate differential thermal expansion.

5. A gas turbine arrangement as claimed in claim 1 wherein the ring manifold is located substantially midway between the ends of the flame tube at the hottest region of the combustion chamber.

6. A gas turbine arrangement as claimed in claim 1 wherein the ring manifold is longitudinally flattened and encircles the flame tube in closely spaced relation.

7. A gas turbine arrangement as claimed in claim 1 wherein the combustion apparatus is of the cannular type comprising a ring of combustors and wherein each combustor is provided with a ring manifold and means for supplying thrust augmenting liquid to each of the ring manifolds comprising a main ring manifold encircling the combustion apparatus.

References Cited in the file of this patent

UNITED STATES PATENTS

| 2,464,791 | Bonvillian et al. | Mar. 22, 1949 |
| 2,636,345 | Zoller | Apr. 28, 1953 |

FOREIGN PATENTS

| 115,211 | Great Britain | May 2, 1918 |
| 463,738 | Great Britain | Apr. 6, 1937 |
| 644,719 | Great Britain | Oct. 18, 1950 |